United States Patent [19]

Traynor

[11] Patent Number: 4,543,402
[45] Date of Patent: Sep. 24, 1985

[54] ELECTRICALLY CONDUCTIVE PYRROLE POLYMERS

[75] Inventor: Lee Traynor, Akron, Ohio

[73] Assignee: The B. F. Goodrich Company, Akron, Ohio

[21] Appl. No.: 486,161

[22] Filed: Apr. 18, 1983

[51] Int. Cl.$^4$ ..................... C08D 13/00; C08F 126/06
[52] U.S. Cl. .................................. 526/258; 204/180.2;
 252/500; 548/400; 548/517; 548/518; 548/541;
 548/577; 548/579
[58] Field of Search ............... 548/400, 517, 518, 541,
 548/577, 579; 526/258; 252/500; 204/181 R

[56] References Cited

U.S. PATENT DOCUMENTS 2,810,726 10/1957 Howard .............................. 526/258
3,070,604 12/1962 Drummond ......................... 526/258
3,301,918 1/1967 Dereich ............................... 526/258

Primary Examiner—Harry Wong, Jr.
Attorney, Agent, or Firm—Alfred D. Lobo; James R. Lindsay

[57] ABSTRACT

Organic polymers which are "hydroxyphenyl-substituted" and "ether-substituted" polypyrroles ("PP") linked through N-adjacent C atoms, are disclosed which are compactable, extrudable and are also electrical conductors. When such PPs are prepared by electrochemical deposition with an appropriate electrolyte, they are also soluble in commonly available solvents, provided at least one of the 3- or 4- positions of the pyrrole nucleus is substituted with a substituent having either a hydroxyphenyl, or an ether structure. By choice of the hydroxyphenyl and/or ether substituent on one of the substitutable positions (3- or 4-) of the pyrrole nucleus, or both, the PP may be tailored for use either as a semiconductor having a conductivity in the range from about $10^{-5}$ to about $10^{-2}$ S/cm, or a relatively good conductor having a conductivity in the range from about $10^{-2}$ to about $10^2$ S/cm. A method is disclosed for preparing an ether-substituted pyrrole comprising reacting a non-Michael acceptor selected from the group consisting of esters, ketones and nitriles having vinylene carbon atoms, with tosylmethylisocyanide, in the presence of a solvent, so as to form a hydroxyphenyl-substituted or an ether-substituted pyrrole directly without substituting the pyrrole ring in the 2- and 5- positions.

7 Claims, No Drawings

ELECTRICALLY CONDUCTIVE PYRROLE POLYMERS

BACKGROUND OF THE INVENTION

This invention relates to organic conductors and semiconductors which fall into the group of polymeric conductors. As is well known, such conducting polymers appear in some respects like common synthetic resinous materials, but unlike such common materials (plastics), conducting polymers defy conventional melt-processing, cannot be compacted, whether molded or extruded, in the usual ways, nor deposited as a continuous film from solution, and are far from stable in air even at ambient temperature conditions. As long as a polymer is formed by electrodeposition on an electrode its conductivity may be said to be fair depending upon the particular application for which the polymer is sought. But a polymer which defies compaction into a shaped article, places severe limitations upon its use. Because a compactable conductor (the term "conductor" as used herein includes semiconductors) is far more versatile in its applications, the problem was to find a compactable polymer.

Tinkering with the structure of conducting polymers to improve their processability, for example by introducing substituents, generally results in degradation of their already low conductivity, consistent with the belief that conductivity is along the polymer chains. Low conductivity in the range from about $10^{-5}$ to about $10^{-2}$ ohm$^{-1}$cm$^{-1}$(reciprocal ohms/cm is hereafter designated "S/cm" for convenience) places a conductor in the category of semiconductors, while conductivity in the range from about $10^{-2}$ to about $10^2$ S/cm and above places it in the category of relatively good conductors. Of course, such "low conductivity" is referred to as such only in relation to the high conductivity of metals, but this low conductivity is sufficiently high for a variety of applications, for example, as polymer films on electrodes, as is described in articles titled "Polymer Films on Electrodes. 6. Bioconductive Polymers Produced by Incorporation of Tetrathiafulvalenium in a Polyelectrolyte (Nafion) Matrix" by Henning, T. P., White, H. S., and Bard, A. J., *J. Am. Chem. Soc.*, 103 3937-3938, (1981); and, "Polymer-Modified Electrodes: A New Class of Electrochemical Materials", by Kaufman, F. B., Schroeder, A. H., Engler, E. M., and Patel, V. V. *Appl. Phys. Lett.*, 36(6), 422-425, (1980).

Poly(2,5-pyrrole), also referred to herein as "PP" for brevity, in which the —NH— group links sequences of conjugated double bonds, is normally an insulator, that is, has a conductivity less than about $10^{-10}$ohm$^{-1}$cm$^{-1}$ and is totally insoluble in known solvents. It is known however, that electrochemically polymerized PP has good conductivity, but coupled with its melt-processing-resistance and the poor integrity of PP film so formed, the metamorphosis of PP into a practical organic polymer conductor poses a formidable problem. Moreover, it is generally known that providing substituents on the pyrrole monomer does not improve the conductivity of PP. This is not undesirable with respect to tailoring a semiconductor but contraindicates a logical course of action for tailoring a relatively good conductor.

The interest in modification of electrode surfaces by covalently attaching an organic monolayer or by depositing a polymer film spurred the electrochemical polymerization of pyrrole under controlled conditions as reported in "Electrochemical Polymerization of Pyrrole" by Diaz, A. F. et al in *J. C. S. Chem. Comm.* 1979, 14, 635. The films may be prepared in a variety of aprotic solvents but are totally insoluble in known solvents including acetonitrile (MeCN), methylene chloride and propylene carbonate. Subsequently, PP with p-type conductivity of 100S/cm was prepared which were stable in air. These films were prepared from MeCN solution using a tetraethylammonium tetrafluoroborate electrolyte, as described in "Organic Metals: Polypyrrole, a Stable Synthetic 'Metallic' Polymer" by Kanazawa, K. K. et al in *J. C. S. Chem.* 1979, 15, 854. Because the polymer film remains on the electrode surface as it is generated, the ability of the PP film to conduct is critical for the continuation of the reaction forming the film. Considerations related to the forming of the film, the electroactive behavior of thin films, and other details are discussed in "Electrochemical Preparation and Characterization of Conducting Polymers" in *Chemica Scripta.*, 1981, 17 145-148.

Particularly noteworthy is that PP requires no dopant because it is naturally positively charged indicating it already has an electron removed during polymerization. Even more noteworthy is that PP films which were formed with various substituents on the N-atom were also totally insoluble. The magnitude of this limitation may only be gauged in terms of the limited application of any polymer which requires that it be electrodeposited on an electrode as a film, and which must be used in no other but the film form. At best, film of known PPs is difficultly powdered, and such powders as are formed cannot be pressed into a coherent shaped article even at 100.000 psi.

Despite knowing that substituents on the pyrrole ring would diminish conductivity, and recognizing that the 2- and 5- positions must necessarily remain open if the substituted pyrrole is to be polymerized, I surmised that the possibility of making compactable PP might hinge upon my finding the correct combination of substituents on the pyrrole nucleus. I further hoped that such a 3- and/or 4- substituted pyrrole would lend itself to electrochemicial polymerization with an appropriate electrolyte which might favorably affect the solubility of the polymer formed.

Since only the polymer is electrically conductive, it is essential that the substituted pyrrole be electrochemically polymerizable. It is known however, that certain substituents negate such polymerization. Thus, until a soluble polymer was actually prepared, there was no way of inferring which substituents were more desirable than others. It was evident to me that such a search for soluble PP would require the synthesis of a large number of substituted pyrroles, and, following their polymerization to PPs, these PPs would need to be culled for desirable properties.

Where one of the substitutable positions (namely either the 3- or 4-positions, the others being necessarily kept open for polymerization), is substituted with phenyl, the other has been substituted with a variety of substituents forming (i) 3,4-diphenylpyrrole (see CA 87 (13):102110z); CA 80 (17):95696v; CA 62:16251/C; (ii) 1-(4-phenyl-1H-pyrrol-3-yl)-ethanone (see CA 78(17): 111044x; (iii) phenyl(4-phenyl-1H-pyrrol-3-yl)-methanone (see CA 91(7):56973r; or, (iv) the methyl ester of 1H-pyrrole-3-carboxylic acid (see CA 95(21):187068e; CA 95(17): 150318k; or, (v) 3-cyano-4-phenylpyrrole (see CA 93(11):114314f; or, (vi) 3-chloro-4-phenyl-pyrrole (see CA 74(21): 108594p; CA 73(21)10661n; CA 67(19): 906-66g; or, (vii) 3-nitro-4-phenyl-pyrrole; or, (viii) 1-methyl-3-phenyl-4-[(trifluoromethyl)sulfonyl]-]H-pyrrole (see CA 95(7):6]902d; or, (ix)], 3-diphenyl-4-[(trifluoromethyl)sulfonyl]-1H-pyrrole (see CA 95(7):6]902d. However, PPs derived from such phenyl substituted monomers, even if electropolymerizable, are not compactable.

The only compound made with an ether substituent in the 3- position is the methoxy-phenyl pyrrole derivatives disclosed in "Synthesis of 3-substituted Pyrrole Derivatives with Anti-inflammatory Activity" by Kazuo Sakai et al, *Chem. Pharm. Bull.*, Vol. 28, 8, pp 2384-2393 (1980). In this procedure, an isocyano group is used, in addition to an amide group, to counteract the electrondonating effect of the ether substituent. Even so, upon closing of the pyrrole ring, amide substituents are present at both the 2- and 4- positions. These substituents may be removed by hydrolysis to the acid with NaOH, then decarboxylating with ethanolamine or glycerine. However, if the methylsubstituent is desired at the 4-position, reduction will produce methyl substituents at both the 2- and 4-positions, with no known means for removing the 2-methyl selectively. In other words, though the electron-withdrawing power of the isocyano group was bolstered with an amide group to make the reactant a Michael acceptor, a substituent at the 4-position may not be made with the Sakai procedure if the 2-position is to be kept open.

Since the product of interest is the PP polymer, it is necessary that the N-adjacent carbon atoms (that is, the C atoms in the 2- and 5- positions) be left open. Of the remaining 3-, 4- and N- positions, there was nothing to suggest that the substituent on one of them would be critical insofar as being effective to transform incompactable PP to compactable PP, if indeed the substituted PP proved to be electrically conductive. Nor was there anything to suggest that the critical ether substituent in the 3- or 4- position might, with the proper choice of electrolyte, lend the PP both solubility and enhanced conductivity.

I polymerized several compounds I made for the specific purpose of studying the electronic affects of substituents on conductivity, and it was only by chance that I discovered the criticality of the substituents at the substitutable positions of a pyrrole monomer. This led me to find an appropriate method of preparing particularly substituted monomers suitable for electropolymerization.

Accordingly, I prepared a host of substituted pyrroles using known techniques of synthesis, and particularly (i) the van Leusen procedure (see "A New and Simple Synthesis of the Pyrrole Ring System from Michael Acceptors and Tosylmethylisocyanides" by van Leusen, A. M. et al, *Tetrahedron Letters,* No. 52, pp 5337-5340, 1972); (ii) the Anderson/Loader synthesis *Tetrahedron Letters,* Vol 22, No. 49 pp 4899-4900 (1981); (iii) the Rokach synthesis, *Tetrahedron Letters,* Vol. 22, No. 49 pp 4901-4904 (1981); and (iv) the Baldwin synthesis *J. Chem. Soc., Chem. Comm.,* pg 624 (1982).

I was unable to make substituted pyrroles with either a hydroxyphenyl substituent, or an ether substituent at either the 3- or 4- positions, by using either the Anderson/Loader, Rokach or Baldwin syntheses. And I did not expect to be able to make such a substituted pyrrole with the van Leusen procedure because it is well known that an ether and hydroxyl substituent are each electron-donating groups (see *Physical Organic Chemistry,* by Hammett, L. P., 2d ed. McGraw Hill & Co., New York 1970; and, "An Extended Table of Hammett Substituent Constants Based on the Ionization of Substituted Benzoic Acids", by McDaniel and Brown, *J. Org. Chem.* 23 420, 1958). The presence of the ether group, or the hydroxyphenyl group, would be expected to negate the necessary electron-withdrawal from between the vinylene C atoms of an alpha,beta-unsaturated ketone, ester or nitrile, without which closing of the pyrrole ring would not occur.

Further, I was aware that a "Michael condensation" between isopropyl p-methoxybenzylidenemethyl ketone with diethylmalonate, when carried out in ethanol as a solvent, gives p-methoxycinnamic acid, indicating a "reverse" or "retrograde reaction". See "*The Michael Reaction*", *Organic Reactions* Vol. 10, 187 et seq., John Wiley & Sons (1959).

Having succeeded in making the desired substituted pyrroles either with a ketone, or a nitrile, or an ester reactant, each of which was not a typical Michael acceptor, I electrochemically polymerized the hydroxyphenyl- and ether-substituted pyrroles so formed. Finally, I tested the PPs for electrical properties, and most of all, for compactability, and/or solubility in available solvents.

This invention is the culmination of that search.

SUMMARY OF THE INVENTION

I have discovered that "hydroxyphenyl-substituted" and "ether-substituted" polypyrroles ("PP") linked through N-adjacent C atoms, are compactable and deformable upon compaction, and are also conductors. When such PPs are prepared by electrochemical deposition with an appropriate electrolyte, they are also soluble in commonly available solvents, provided at least one of the 3- or 4-positions of the pyrrole nucleus in substituted with a substituent having either a hydroxyphenyl, or an ether structure. By choice of the hydroxyphenyl and/or ether substituent on one of the substitutable positions (3- or 4-) of the pyrrole nucleus, or both, the PP may be tailored for use either as a semiconductor having a conductivity in the range from about $10^{-5}$ to about $10^{-2}$ S/cm, or a relatively good conductor having a conductivity in the range from about $10^{-2}$ to about $10^2$ S/cm.

It is therefore an object of this invention to provide novel electrically conductive PP homopolymers which are generally electrodeposited as powders which are compactable, that is, pressable or extrudable into shaped articles. The PPs are derived from a monomer having the following structure:

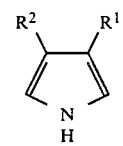

(I)

wherein,

R[1] is selected from the group consisting of hydrogen, alkyl having from 1 to about 6 carbon atoms, cycloalkyl having from 3 to about 7 ring carbon atoms one or more of which may be substituted, alkoxyalkyl having from 3 to about 24 carbon toms, and benzyl which may optionally be ring-substituted with halogen or lower alkyl having from 1 to about 6 carbon atoms;

R$^2$ is selected from the group consisting of hydroxyphenyl which may be ring-substituted, and an acyclic ether selected from the group consisting of (i) alkoxy represented by -OR$^3$, wherein R$^3$ represents alkyl having from 1 to about 12 carbon atoms, alkoxyalkyl having from 2 to about 24 carbon atoms, phenyl which may be substituted, benzyl or substituted benzyl, heteroaryl or substituted heteroaryl; (ii) polyalkoxy represented by the structure CH$_3$—OCH$_2$CH$_2$—$_n$ wherein n is an integer in the range from 1 to about 20; and (iii)R$^4$—O—R$^5$ wherein either R$^4$ or R$^5$ is a linking group selected from phenyl and benzyl, each of which may be substituted, alkyl having from 1 to about 24 carbon atoms, and cycloalkyl having from 3 to about 7 ring carbon atoms one or more of which may be substituted; and, R$^1$ may be substituted with R$^2$, and if so substituted, each R$^2$ substituent may be the same or different.

It has further been discovered that certain non-Michael acceptors, such as esters, ketones and nitriles with an ether moiety, or hydroxyphenyl moiety, each of which has an electron-donating effect, are nevertheless susceptible to a van Leusen synthesis in which the vinylene carbon atoms become part of a pyrrole ring.

It is therefore also a general object of this invention to provide a synthesis of substituted pyrroles in which at least one of the 3- or 4- positions has a hydroxyphenyl or an ether substituent, comprising, reacting substantially equimolar amounts of tosylmethylisocyanide with a hydroxyphenyl-substituted or an ether-substituted non-Michael acceptor ester, ketone or nitrile, in the presence of a mutual solent, and with an effective amount of a strong base selected from the group consisting of an alkali metal hydride, ethoxide, or amide, at ambient temperature and pressure, so as directly to form a compound with the structure (II) in which the 2- and 5- positions are kept unsubstituted.

It has still further been discovered that particularly 3,4-disubstituted pyrroles can now be synthesized despite the starting material being a non-Michael acceptor.

It is therefore also a general object of this invention to provide novel compounds having the following previously unknown structure:

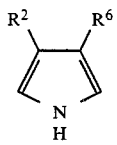
(II)

wherein,

R$^2$ has the same connotation as hereinbefore, and,

R$^6$ is selected from the group consisting of (i) carboxylate,

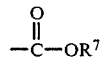

wherein R$^7$ represents alkyl having from 1 to about 24 carbon atoms; (ii) nitrile, —CN; and, (iii) acyl,

wherein R$^8$ represents alkyl having from 1 to about 24 carbon atoms, phenyl or polyalkoxy having from 4 to about 40 carbon atoms.

DETAILED DESCRIPTION OF PREFERRED EMBODIMENTS

The conductive polymer of this invention may be represented by the structure:

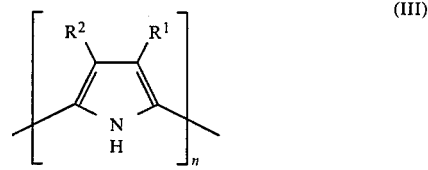
(III)

wherein, n is an integer in the range from 2 to about 100, and more preferably in the range from about 5 to about 20; and, R$^1$ and R$^2$ have the same connotation as that given hereinabove.

In carrying out the electrochemical deposition of the polymer, one preferred method comprises electrochemically oxidizing the ether-substituted pyrrole in a manner analogous to that known for producing PP "pyrrole black" from pyrrole (see "Electrochemical Polymerization of Pyrrole", by Diaz, A. F. et al, *J.C.S. Chem. Comm.*, 1979, 635–636). The PP is formed as a powdery deposit which remains on the electrode surface and no significant slow-down of polymer build-up is noted as the electrodeposition continues. Because it so happens that the PP powder is compactable, it is fortuitous that the PP is generally deposited as a powder. In some cases, depending upon the choice of substituents and conditions of electrodeposition, a PP film may be formed. As will be appreciated, when a film is formed, as is the case with known PPs, build-up of the film on the electrode will tend to insulate the electrode, slowing deposition of the polymer.

It will not as easily be appreciated that conventional PP film cannot be transformed into another shape. It yields an unsatisfactory powder which does not lend itself to being either compacted into discs or plates, or extruded into strips or rods of arbitrary length. It it therefore regarded as being non-compactable and non-deformable.

As will be readily evident, the total insolubility of known PPs dictates that it cannot be cast from a solvent; nor can its molecular weight be measured by conventional techniques.

The known stoichiometry of the oxidation reaction during electrodeposition, combined with the insolubility of the powdery deposit in the electrolyte permits continuous deposition of the powder. Where a film is formed, which occurs with certain substituents more easily than others, and which is also a matter of the choice of electrolyte and electrodeposition conditions chosen, the desired thickness of the film may be controlled by monitoring current density of the reaction. In general, the polymer is formed as a powder which is scraped off the electrode at intervals, and compacted or extruded under sufficient pressure and at elevated temperature, to produce the shaped article desired.

It is preferred that the PP be produced under an inert blanket such as a $N_2$ atmosphere, in a three electrode, undivided electrochemical cell using palladium, platinum or other noble metal electrodes for the working and counter electrodes, and a standard calomel reference electrode (SCE), for the purpose of monitoring the current. Of course, on a production scale, stainless steel electrodes may be desirable and other methods of monitoring the current may be used, so that the reference electrode may be dispensed with.

Acetonitrile (MeCN) and propylene carbonate are preferred solvents for the monomer, though any other solvent with an acceptable dielectric constant may be used, as long as the solvent is also a solvent for the electrolyte. Preferred solvents are those with relatively high dielectric constants in the range above about 30, such as dimethylformamide (DMF), dimethylsulfoxide (DMSO), methanol, nitromethane and the like. Preferred electrolytes are those which, in solution, contribute a strong acid ion, such as tetraalkylammonium salts of tetrafluoroboric, hexafluorophosphoric and sulfuric acids, the most preferred being alkylammonium hydrogen sulfates such as tetrabutylammonium hydrogen sulfate, and alkylammonium sulfonates such as tributylammonium m-nitrobenzene sulfonate.

It has been found that propylene carbonate is the most preferred medium for electropolymerization of the monomer, and if an alkylammonium sulfonate or hydrogen sulfate is the electrolyte, the PP powder deposited is not only compactable but also soluble in commercially available solvents. By "soluble" I indicate that at least 10 parts by weight of the PP may be dissolved in 100 parts by weight of solvent. Typically, the PP is soluble in aprotic aromatic and heteroaromatic solvents such as toluene, xylene, etc., chlorinated and fluorinated hydrocarbons such as methylene chloride (MeCl) and the various Freons[R], lower alkyl esters such as ethylacetate, DMSO, THF and comparable aprotic solvents.

The thickness of the powdery deposit is arbitrary but where films are formed, they are typically in the range from about 0.01-0.2 mm thick. Both the film and powder adhere to the electrode displaying good conductivity in the range from about $10^{-2}$ to about 10 S/cm. The polymer was deposited for experimental purposes at constant potential on a 75 cm$^2$ platinum electrode.

Elemental analyses indicate the novel PPs are composed of about 60-95% by weight of pyrrole units, the remaining being the anion (preferably $HSO_4^-$) from the electrolyte used, and trace amounts of contaminants. The PP accounts for from about 90-99% by wt of the polymer formed.

The electropolymerized PP is found to be oxidized to the extent of one positive charge for every two to about four (2-4) pyrrole units. The PP is stable at room temperature and up to about 150° C. which is also a characteristic of PP films which are not either hydroxyphenyl or ether substituted.

The ether-substituted, or hydroxy-substituted, pyrrole is prepared by reacting a non-Michael acceptor selected from the group consisting of esters, ketones and nitriles having the structures:

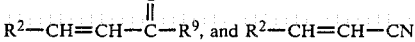

wherein,
$R^9$ is selected from the group consisting of alkyl having from 1 to about 24 carbon atoms, alkoxy having from 2 to about 24 carbon atoms, phenyl or benzyl each of which optionally may be substituted, cycloalkyl having from 3 to about 7 carbon atoms, and heteroaryl which may be substituted; and,
$R^2$ has the same connotation as given hereinabove; with tosylmethylisocyanide ("TosMIC") in the presence of a solvent, at a temperature and pressure sufficient to form an ether-substituted pyrrole directly without substituting the pyrrole ring in the 2- and 5- positions.

The solvent for TosMIC is typically a mixture of equal parts by volume of diethylether and dimethylsulfoxide, and the reaction is conveniently carried out at room temperature and pressure. In some cases it is desirable to increase the temperature to accelerate the reaction and a temperature as high as about 100° C. or higher may be used in a pressure vessel which contains the autogenous pressure build-up.

Since the vinylene C atoms end up as the 3- and 4- C atoms of the pyrrole ring, it is necessary that at least the hydroxyphenyl substituent be provided on the structure (IV) before reaction with TosMIC. If an ether substituent is desired instead of the hydroxyphenyl at that position, one may provide the ether substituent on a ketone, ester or nitrile before reaction with TosMIC, the ester being most preferred.

With the method of this invention it will now be evident that esters with appropriate ether substituents may be readily obtained for reaction with TosMIC in the presence of solvent and NaH, to form the following ether-substituted pyrroles:

3-ethoxy-4-carboxymethylpyrrole;
4-(4-hexyloxyphenyl)-3-carboxymethylpyrrole;
3-(2-ethoxy-5-pyridyl)-4-acetylpyrrole;
3-(4-methoxyphenyl)methyl-4-carboxymethylpyrrole;
3-(4-[2-poly(ethoxy)$_n$']phenyl)-4-carboxymethylpyrrole;
3,4-bis(p-methoxybenzoyl)pyrrole;
4-(4-ethoxy)cyclohexyl-3-acetylpyrrole; and,
3-ethoxy-4-(4-chlorophenyl)carboxymethylpyrrole.

Sometimes it is convenient to derive the ether substituent from the hydroxyphenyl substituent at the same position the latter occupies, for example, in the following sequence of steps. Malonic acid and p-hydroxybenzaldehyde are reacted to form p-hydroxycinnamic acid, followed by esterification with methanol in the presence of conc $H_2SO_4$ to form the methyl ester. This ester is then reacted with TosMIC in the presence of NaH to form methyl 4-hydroxyphenylpyrrole-3-carboxylate ("P-carboxylate"). The P-carboxylate is then reduced with $LiAlH_4$ in THF to the 3-methyl-4-hydroxyphenylpyrrole which is then reacted with allyloxybutyl bromide to yield the 4-(4-allyloxybutoxyphenyl-3-methylpyrrole.

Preferably, as explained hereinabove, the ether substituent may be placed on the ester, ketone or nitrile prior to reaction with TosMIC, as illustrated in example 1 hereinbelow with a typical procedure for making the 4-allyloxybutoxy)phenyl substitution on the 4-position of the pyrrole ring, using an ether-substituted ester.

EXAMPLE 1

4-allyloxybutyl-p-toluene sulfonate is reacted with p-hydroxybenzaldehyde in the presence of KOH and $C_2H_5OH$ to form 4-(4-allyloxybutoxy)benzaldehyde which is reacted with malonic acid in the presence of pyridine to form p-(4-allyloxybutoxy)cinnamic acid. The acid is esterified with $CH_3OH$ and sulfuric acid to yield the methyl ester, namely methyl p-(4-allyloxybutoxy)cinnamic carboxylate. This methyl ester is then reacted with TosMIC in $Et_2O/DMSO$ in the presence of sodium hydride or other strong base to form the substituted pyrrole, represented as follows:

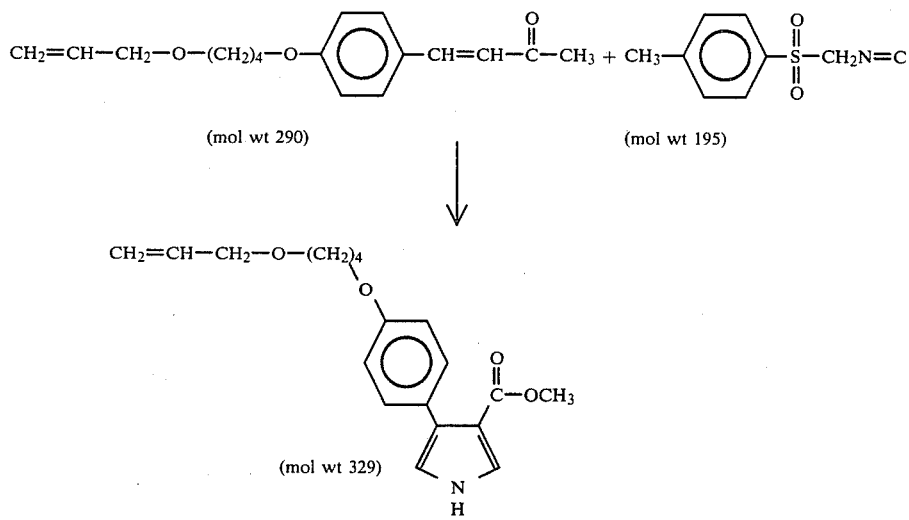

In a manner analogous to that described hereinabove, carboxylate substituents may be provided on the 3-position of the pyrrole ring where the starting material is a hydroxyphenyl-substituted ester with the requisite vinylene C atoms for completion of the pyrrole ring. Also, whether the starting material is hydroxyphenyl- or ether-substituted, their nitriles and ketones, again with the requisite vinylene C atoms, yield pyrroles with nitrile (—CN) and acyl substituents, respectively, at the 3-position.

Thus, depending upon the choice of substituents desired at the 3- and 4- positions of the pyrrole ring, numerous compounds may be prepared having the structure:

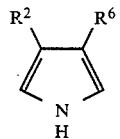

(II)

wherein, $R^2$ and $R^6$ have the same connotation as given hereinbefore. In addition to being intermediates for the preparation of monomers which may be electropolymerized, compounds with the structure (II) are anitmicrobial and antiinflammatory agents.

In general, these compounds (II) are found not to be electropolymerizable, presumably because of the electron-withdrawing group at the 3-position, so they are either converted (a) to remove the inhibiting substituent, or (b) to replace that substituent with one which is not.

Where, for example, the 3-substituent is carboxylate, step (a) is conveniently effected by heating with alkali (KOH) in diethylene glycol to about 180° C. Step (b) is preferably effected by reducing with a hydride reducing agent such as $LiAlH_4$ in THF solution.

Where the 3-substituent is acyl, it is preferably reduced with a hydride reducing agent, as before, so that an acetyl group would be converted to an ethyl group at the 3-position.

Where the 3-substituent is nitrile, the compound is preferably hydrolyzed by heating with acid, then reduced as before to leave a —COOH substituent which is further reduced to —$CH_3$.

For example, methyl 4-(4-hexyloxyphenyl)-3-carboxylate may be converted as follows:

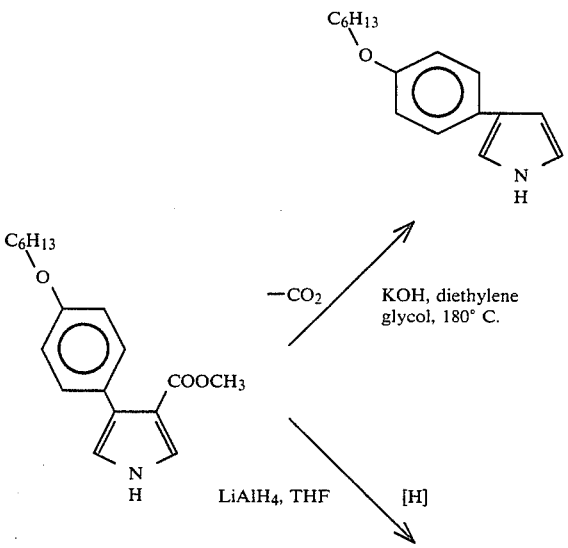

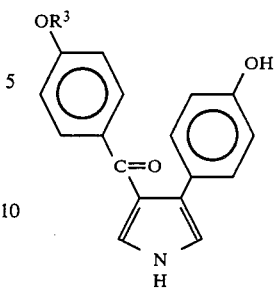

The foregoing reduction reactions yield compounds having the general structure:

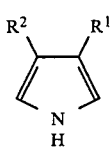

wherein, $R^1$ and $R^2$ have the same connotation as hereinbefore. These compounds, like the compounds having the structure (V), also have antimicrobial and antiinflammatory properties.

Whether methyl substituted at the 3-position or not substituted, each of the reduced compounds is oxidatively electropolymerizable in the presence of an electrolyte contributing a strong acid anion, in a solvent for the monomer and electrolyte, with sufficient current intensity and potential to deposit a powder or film of PP on the anode. The optimum current may be arrived at with a little trial and error, it being evident that relatively close spacing of the electrodes is preferred in the range from about 0.5 cm to about 5 cm so that an applied voltage in the range from about 1 to about 100 volts will give an intensity in the range from about 1 to about 100 mA/cm² based on the surface area of the electrode.

It is also preferred to use as concentrated a solution of electrolyte as is economical, though concentrations in the range from about 0.05 M (molar) to about 1 M solutions will produce polymer. The choice of electrolyte is also based on a little trial and error and may be made from well known alkylammonium salts such as those related to ones disclosed in Angewandte Chemie, International Edition in English, 16 (August 1977), and in U.S. Pat. No. 3,992,432 the disclosures of which are incorporated by reference thereto as if fully set forth herein.

Polymers of desirable mol wt are obtained when the monomer to be electrodeposited is substituted with electron-donor substituents at each of the 3- and 4-positions. Such monomers are obtained from compounds (II) so that the substituents may each be hydroxyphenyl; or one may be hydroxyphenyl and the other an ether; or each may be ether; and when ether, the ether may be directly attached to the pyrrole ring, as with alkoxy, or they may be linked to the pyrrole ring with a linking group, as with a hexyloxyphenyl substituent.

Illustrative preparations of some of the foregoing are as follows:

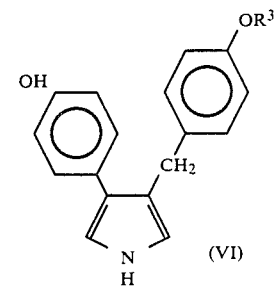

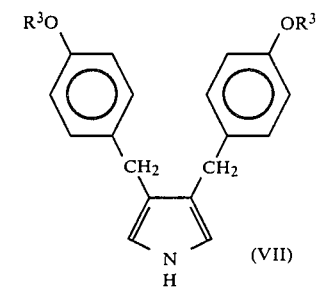

wherein $R^3$ has the same connotation as hereinbefore.

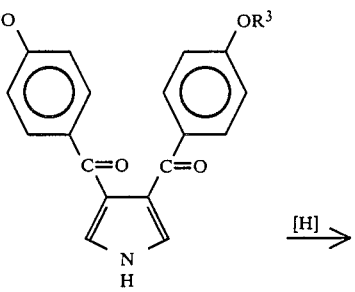

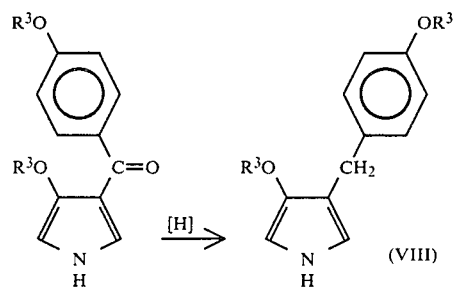

wherein $R^3$ has the same connotation as hereinbefore, and may be the same or different; and each of the foregoing reactions is a reduction of the carbonyl group.

In example 2 hereinbelow is illustrated a typical oxidative electropolymerization of a soluble PP represented by the structure:

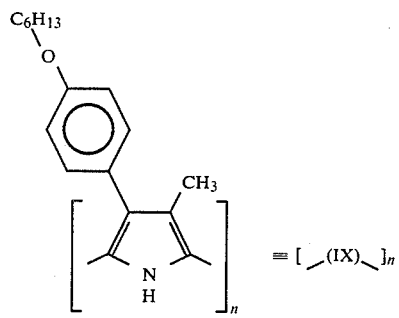

wherein n is an integer in the range from about 3 to about 10.

EXAMPLE 2

In a glass reaction vessel is placed a solution containing 700 ml of propylene carbonate, 23.4 g of tetrabutylammonium hydrogen sulfate and 62.4 g of 4-(4-hexyloxyphenyl)-3-methylpyrrole. Two palladium electrodes each having a surface area of about 75 cm$^2$ were placed in the solution about 2 cm apart. A total current flow of 38 amp.min. was passed through the solution. A black solid is deposited on the anode. After about 4 hr, the anode is removed by impinging a jet of MeCN on the electrode surface, and the electrode is rinsed thoroughly with MeCN. A black powdery deposit is thus removed from the electrode and the powder is then allowed to soak in 50 ml MeCN for about 16 hours. The MeCN and solid are then filtered and dried in a vacuum oven at about 120° C. for 16 hr. The dry weight of solid is 3.5 g.

The solid is found to be highly soluble in MeCl, toluene, ethyl acetate and THF. It is less soluble in diethyl ether and essentially insoluble in MeCN and propylene carbonate.

A sample of the black solid is pressed into a thin disc using a plunger type mold in which the pressure exerted is about 15,000 psi. Powder PP so obtained is compactable at pressures as low as 5000 psi and even lower except that at such lower pressures the disc obtained is so fragile that it is difficult to handle routinely. Pressure above about 15,000 psi does not appear to result in substantially higher density than about 1.2 g/cc as determined by flotation in a liquid of matched density. Other PPs have a density in the range from about 1.1 to about 1.5 g/cc. Electrical conductivity of a disc having a thickness in the range from about 0.03 to about 0.05 cm, using the van der Pauw technique (*Phillips Tech. Rev.* 20 320, 1958), was found to be 0.01 S/cm.

Analysis of the black solid confirmed the structure to be that given hereinabove.

| Elemental analysis: $[(IX)]_1 [HSO_4^-]_{0.32} [H_2O]_{0.013} [C_4H_6O_3]_{0.16}$ | | | | |
|---|---|---|---|---|
| Calculated | C = 69.9 | H = 7.37 | N = 4.63 | S = 3.43 |
| Found | C = 69.79 | H = 7.51 | N = 4.62 | S = 3.42 |

The ratio of the aforespecified moieties associated with a single repeating unit (IX) of the polymer was derived by attributing the S in the elemental analysis to the HSO$_4^-$ ion, and adjusting the remainder between the residue of propylene carbonate [C$_4$H$_6$O$_3$] solvent which contains a little water, and the trace of water which is known to be associated with the polymer in a somewhat similar manner as in a hydrate.

In a manner analogous to that described hereinabove, a polymer of 4-(4-methoxyphenyl)-3-methylpyrrole was deposited as a black powder, which was compacted into discs 0.25" (inch) diam., with thicknesses from 0.03–0.04 cm using pressures in the range from 10,000–100,000 psi, and the conductivities measured. Both the methoxy- and hexyloxyphenyl-substituted polymers were soluble in MeCl, THF and DMSO.

| Polymer | Conductivity, S/cm |
|---|---|
| 4-(4-hexyloxyphenyl)-3-methylpyrrole | $1.1 \times 10^{-2}$ |
| 4-(4-methoxyphenyl)-3-methylpyrrole | $5.2 \times 10^{-5}$ |

Though specific emphasis has been placed on the ether substituted pyrroles which may be obtained from non-Michael acceptors which are esters, ketones or nitriles having vinylene carbon atoms, it will now be evident that reaction with compounds having either structure (IV) and tosylmethylisocyanide, in the presence of a solvent, and at a temperature and pressure sufficient to form a hydroxyphenyl-substituted or an ether-substituted pyrrole directly without substituting the pyrrole ring in the 2- and 5- positions, compounds will be formed having the structures:

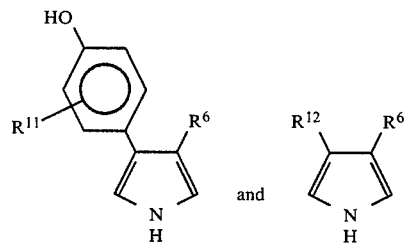

wherein,

R$^6$ has the same connotation as hereinbefore;

R$^{11}$ is a ring-substitutent selected from the group consisting of lower alkyl having from 1 to about 6 carbon atoms, chlorine and bromine;

R$^{12}$ is selected from an acyclic ether selected from the group consisting of (i) alkoxy represented by —OR$^3$, wherein R$^3$ represents alkyl having from 1 to about 12 carbon atoms, alkoxyalkyl having from 2 to about 24 carbon atoms, phenyl which may be substituted, benzyl or substituted benzyl, heteroaryl or substituted heteroaryl; (ii) polyalkoxy represented by the structure CH$_3$—OCH$_2$CH$_2$—$_{n'}$ wherein n' is an integer in the range from 1 to about 20; and (iii) R$^4$-O-R$^5$ wherein either R$^4$ or R$^5$ is a linking group selected from phenyl and benzyl, each of which may be substituted, alkyl having from 1 to about 24 carbon atoms, and cycloalkyl having from 3 to about 7 ring carbon atoms one or more of which may be substituted; and, R$^7$ or R$^8$ (in R$^6$) may, in addition, be hydroxyphenyl having a R$^{11}$ ring substituent.

The polymers having the structure (III) are particularly useful for conductivity control in solid-state micro circuits.

As has already been pointed out, pyrroles substituted at the 3- and 4-positions have been made by Sakai et al, supra, and upon reduction to remove the 2-substituent which reduction necessarily also removes the 4-substituent, these compounds are polymerizable to yield the polymers I have discovered to possess such unique properties.

However, there exists no prior art teaching that I know of which enables one to make particular monomers which yield polymers which are especially desirable as conductors and semiconductors. These monomers have the structure:

wherein, $R^2$ has the same connotation as given hereinabove; and, $R^{10}$ is selected from the group consisting of alkyl having from 1 to about 24 carbon atoms, cycloalkylmethylene having from 3 to about 8 ring carbon atoms which may be ring-substituted, and benzyl which may be substituted; and, $R^{10}$ may be substituted with $R^2$, and if so substituted, each $R^2$ is different.

Preferred compounds (X) are those wherein, $R^2$ is alkoxyphenyl the alkyl group being cyclic or acyclic, when cyclic having from 3 to about 8 ring carbon atoms, and when cyclic having from 1 to about ≧ carbon atoms; $R^3$ is lower alkyl having from 1 to about 6 carbon atoms; and, $R^4$ and $R^5$ are each selected from lower alkyl and phenyl, and each may be the same or different.

In addition to being particularly useful for forming the electrically conductive polymers, the monomer having the structure (X) is also found to have antimicrobial and antiinflammatory properties.

Specific monomers for forming the conductive polymers are:

3-ethoxy-4-methylpyrrole;
4-(4-hexyloxyphenyl)-3-methylpyrrole;
3-(2-ethoxy-5-pyridyl)-4-ethylpyrrole;

I claim:

1. A substituted pyrrole polymer linked through N-adjacent carbon atoms of the pyrrole nucleus, said polymer being represented by the structure:

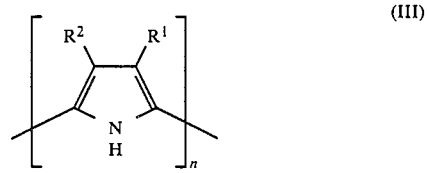

wherein, n is an integer in the range from about 2 to about 100;
$R^1$ is selected from the group consisting of hydrogen, alkyl having from 1 to about 6 carbon atoms, cycloalkyl having from 3 to about 7 ring carbon atoms one or more of which may be substituted, alkoxyalkyl having from 3 to about 24 carbon atoms, and benzyl which may optionally be ring-substituted with halogen or lower alkyl having from 1 to about 6 carbon atoms;

$R^2$ is selected from the group consisting of hydroxyphenyl which may be ring-substituted, and an acyclic ether selected from the group consisting of (i) alkoxy represented by —$OR^3$, wherein $R^3$ represents alkyl having from 1 to about 12 carbon atoms, alkoxyalkyl having from 2 to about 24 carbon atoms, phenyl which may be substituted, benzyl or substituted benzyl, heteroaryl or substituted heteroaryl; (ii) polyalkoxy represented by the structure $CH_3$—$OCH_2CH_2$—$_{n'}$ wherein $n'$ is an integer in the range from 1 to about 20; and (iii) $R^4$—O—$R^5$ wherein either $R^4$ or $R^5$ is a linking group selected from the group consisting of phenyl and benzyl, each of which may be substituted, alkyl having from 1 to about 25 carbon atoms, and cycloalkyl having from 3 to about 7 ring carbon atoms one or more of which may be substituted; and, $R^1$ may be substituted with $R^2$, and if so substituted, each $R^2$ substituent may be the same or different;
said polymer being formed by a process comprising,
(a) forming a solution of said monomer and an electrolyte which generates an acid ion in a mutual solvent, said monomer having the structure

wherein $R^1$ and $R^2$ have the same connotation as that given hereinabove;

(b) passing electrical current between electrodes placed in said solution at an applied voltage and intensity sufficient to deposit a polymer on the anode; and, (c) recovering a compactable powdery deposit of said polymer.

2. The polymer of claim 1 obtained by the electrodeposition of a monomer from a solvent for it, in the presence of an electrolyte which generates an acid ion, said monomer having the structure:

wherein, $R^1$ and $R^2$ have the same connotation as in claim 1.

3. The polymer of claim 2 obtained as a powdery deposit which is compactable into a shaped article.

4. The polymer of claim 3 wherein said electrolyte is an alkylammonium salt, and said polymer is soluble in aprotic aromatic and heteroaromatic solvents selected from the group consisting of toluene, xylene, chlorinated and fluorinated hydrocarbons, lower alkyl esters, dimethylsulfoxide, and tetrahydrofuran.

5. A process for polymerizing a substituted pyrrole monomer, comprising, (a) forming a solution of said monomer and an electrolyte which generates an acid ion in a mutual solvent, said monomer having the structure

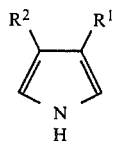 (I)

wherein,

R¹ is selected from the group consisting of hydrogen, alkyl having from 1 to about 6 carbon atoms, cycloalkyl having from 3 to about 7 ring carbon atoms one or more of which may be substituted, alkoxyalkyl having from 3 to about 24 carbon atoms, and benzyl which may optionally be ring-substituted with halogen or lower alkyl having from 1 to about 6 carbon atoms;

R² is selected from the group consisting of hydroxyphenyl which may be ring-substituted, and an acyclic ether selected from the group consisting of (i) alkoxy represented by -OR³, wherein R³ represents alkyl having from 1 to about 12 carbon atoms, alkoxyalkyl having from 2 to about 24 carbon atoms, phenyl which may be substituted, benzyl or substituted benzyl, heteroaryl or substituted heteroaryl; (ii) polyalkoxy represented by the structure $CH_3-OCH_2CH_2-_{n'}$ wherein n' is an integer in the range from 1 to about 20; and (iii) $R^4$-O-$R^5$ wherein either $R^4$ or $R^5$ is a linking group selected from phenyl and benzyl, each of which may be substituted, alkyl having from 1 to about 24 carbon atoms, and cycloalkyl having from 3 to about 7 ring carbon atoms one or more of which may be substituted; and, R¹ may be substituted with R², and if so substituted, each R² substituent may be the same or different;

(b) passing electrical current between electrodes placed in said solution at an applied voltage and intensity sufficient to deposit a polymer on the anode; and, (c) recovering a compactable powdery deposit of said polymer which is linked through N-adjacent carbon atoms of the pyrrole nucleus and represented by the structure:

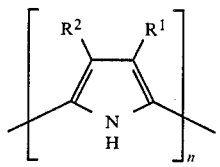 (III)

wherein R¹ and R² have the same connotation as that set forth hereinabove.

6. The process of claim 5 wherein said polymer is compactable.

7. The process of claim 6 wherein said polymer is soluble in aprotic aromatic and heteroaromatic solvents.

* * * * *